United States Patent
Wei et al.

(10) Patent No.: US 8,184,979 B2
(45) Date of Patent: May 22, 2012

(54) OPTICAL OFDMA NETWORK WITH DYNAMIC SUB-CARRIER ALLOCATION

(75) Inventors: Wei Wei, Plainsboro, NJ (US); Ting Wang, West Windsor, NJ (US); Chonggang Wang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 614 days.

(21) Appl. No.: 12/388,068

(22) Filed: Feb. 18, 2009

(65) Prior Publication Data
US 2010/0054735 A1 Mar. 4, 2010

Related U.S. Application Data

(60) Provisional application No. 61/092,486, filed on Aug. 28, 2008.

(51) Int. Cl.
*H04J 14/02* (2006.01)
(52) U.S. Cl. ............................................. 398/89; 398/79
(58) Field of Classification Search ..................... 398/89
See application file for complete search history.

(56) References Cited

U.S. PATENT DOCUMENTS

| | | | |
|---|---|---|---|
| 2009/0123146 A1* | 5/2009 | Li ...................................... | 398/4 |
| 2009/0154927 A1* | 6/2009 | Oksman ........................... | 398/76 |
| 2009/0245415 A1* | 10/2009 | Hosein ........................... | 375/295 |
| 2010/0003030 A1* | 1/2010 | Gilfedder et al. ................ | 398/67 |
| 2011/0176807 A1* | 7/2011 | Biegert ............................ | 398/58 |

OTHER PUBLICATIONS

W. Wei, L. Zong, and D. Qian, Wavelength-Based Sub-Carrier Multiplexing and Grooming for Optical Networks Bandwidth Virtualization, Optical Fiber Communication Conference and Exposition and The National Fiber Optic Engineers Conference, OSA Technical Digest CD, Optical Society of America, Feb. 24, 2008, paper PDP35.*
Bocoi, A., et al. Cost Comparison of Networks Using Traditional 10 and 40 GB/S Transponders Versus OFDM Transponders. OFC/NFOEC 2008. Proc. Optical Fiber Conference (OFC 2008), paper OThB4, San Diego, Feb. 2008. (3 pgs).
Cho, W., et al. Design of MAC Protocols for DWADM-Based Metropolitan-Area Optical Ring Networks. 2001 IEEE. Proc. IEEE GLOBECOM, vol. 3, Nov. 2001. pp. 1575-1579.
Dhaini, A., et al. Dynamic Wavelength and Bandwidth Allocation in Hybrid TDM/WDM EPON Networks. 2007 IEEE. Journal of Lightware Technology, vol. 25, No. 1. Jan. 2007. pp. 277-286.
Herzog, M., et al. Metropolitan Area Packet-Switched WDM Networks: A Survey on Ring Systems. IEEE Communications Surveys & Tutorials. Second Quarter 2004. vol. 6, No. 2. pp. 2-20.
Jansen, S,L., et al. Optical OFDM—A Candidate for Future Long-Haul Optical Transmission Systems. OFC/NFOEC 2008 Conference. Feb. 2008. (3 pgs).
Kim, J., et al. Demonstration of 2.5 GBPS Optical Burst Switched WDM Rings Network. Optical Fiber Communication Conference OFC 2006 post deadline paper. Mar. 2006. (3 pgs).
Luo, Y., et al. Resource Management for Broadband Access Over Time-Division Multiplexed Passive Optical Networks. 2007 IEEE, IEEE Network. Sep./Oct. 2007, pp. 20-27.
Taniman, R.O., et al. Dynamic Capacity Allocation for Low-Cost Multicarrier Multimode PON. 33rd European Conference and Exhibition of Optical Communication. ECOC 07. Sep. 2007. (2 pgs).

(Continued)

*Primary Examiner* — Nathan Curs
(74) *Attorney, Agent, or Firm* — James Bitetto; Joseph Kolodka (57) ABSTRACT

A system and method for dynamically allocating sub-carriers between the nodes of an optical OFDMA ring network or an OFDMA passive optical network. A carrier allocation system assigns sub-carriers according to a utility function based on real-time measurements of arrival data rates and queue length variance.

20 Claims, 5 Drawing Sheets

OTHER PUBLICATIONS

Wei, W., Resource Provisioning for Orthogonal Frequency Division Multiple Access (OFDMA)-Based Virtual Passive Optical Networks (VPON). OFC/NFOEC 2008. Proceedings of OFC/NFOEC 2008 OTu I1. Feb. 2008. (3 pgs).

* cited by examiner

OPTICAL OFDMA NETWORK WITH DYNAMIC SUB-CARRIER ALLOCATION

RELATED APPLICATION INFORMATION

This application claims priority to provisional application Ser. No. 61/092,486 filed on Aug. 28, 2008, incorporated herein by reference.

BACKGROUND

1. Technical Field

The present invention relates to optical orthogonal Frequency Division Multiple Access (OFDMA) networks and, more particularly, to a system and method for dynamically allocating sub-carriers between nodes.

2. Description of the Related Art

Metro core networks are frequently based on fiber optic rings, stemming from legacy Synchronous Optical Network equipment. These networks are often built on a Unidirectional Path Switched Ring structure, having two redundant optical channels that allow for extremely fast recovery in the case of disruption of service. A metro core network serves a relatively large area, with the rings often being hundreds of kilometers in circumference, and provides connection between the local access networks and the long-haul (or backbone) networks.

Prior art implementations of optical metro core networks have been built using time-based resource sharing, as seen in the use of network structures such as RPR, HORNET, and OBT. These resource-sharing schemes schedule transmission such that individual nodes transmit sequentially for a short period of time, using the full bandwidth of the fiber. However, this leads to inefficient use of the network's bandwidth, as it is not responsive to to individual nodes' Quality of Service (QoS) needs. For instance, if a particular node has little data in its queue, its time slot (and hence network bandwidth) will be underused.

There is a similar problem in the implementation of Passive Optical Networks (PONs) such as those used to provide access to homes and businesses. These networks use unpowered optical splitters to share a fiber optic link from a single Optical Line Terminal (located at the service provider) between a plurality of Optical Network Units (located at the end user). These systems typically use time-division to share the link between the users, which presents the same inefficiencies as when time-division is used in a metro core network.

It is therefore advantageous to implement a resource sharing scheme which allows all nodes to transmit simultaneously and which flexibly allocates bandwidth based on QoS needs. One implementation of a metro core network involves the use of an Orthogonal Frequency-Division Multiple Access (OFDMA) scheme. This technique uses a plurality of orthogonal (i.e., non-interfering) sub-carrier frequencies to serve a plurality of nodes. By splitting traffic between the sub-carriers, the bandwidth on the channel is increased without having to alter the infrastructure. In addition, different sub-carriers can be assigned to different nodes on the network, effectively splitting the available bandwidth and allowing all nodes to transmit simultaneously.

However, using a static allocation of sub-carriers leads to a problem similar to that presented in the time-division protocols. If a node is underusing its allocated sub-carriers, then that node's bandwidth is being wasted. In the wireless communications context, OFDMA has several proposed schemes for dynamically allocating sub-carriers between nodes in order to respond to QoS needs. However, these techniques are not effective in the optical domain due to its greater complexity, different fading channel, and low bandwidth flows.

SUMMARY

A system for dynamically allocating sub-carriers to optical transmitters in an optical OFDMA network. The system has a dynamic sub-carrier allocation and assignment module, which is configured to dynamically assign sub-carriers to a plurality of optical transmitters according to a utility function, and a control module, which is configured to communicate sub-carrier assignments to the plurality of optical transmitters. The allocation determinations are made based on real-time measurements of arrival data rates, queue length variance, and Signal to Noise Ratio.

One embodiment of the present principles is in an optical network in a ring topology which uses OFDMA to share bandwidth resources between a plurality of nodes, each node transmitting over an assigned set of sub-carrier frequencies.

Another embodiment is in a passive optical network which uses OFDMA to share bandwidth resources between a plurality of Optical Network Units, each unit transmitting over an assigned set of sub-carrier frequencies.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In order to address the difficulties inherent in dynamically allocating sub-carrier addresses in an optical Orthogonal Frequency Division Multiple Access (OFDMA) network, there exists a need for a sub-carrier allocation scheme that takes into account the particular QoS needs and physical properties of OFDMA communications in optical metro core networks and PONs.

Figure 1:
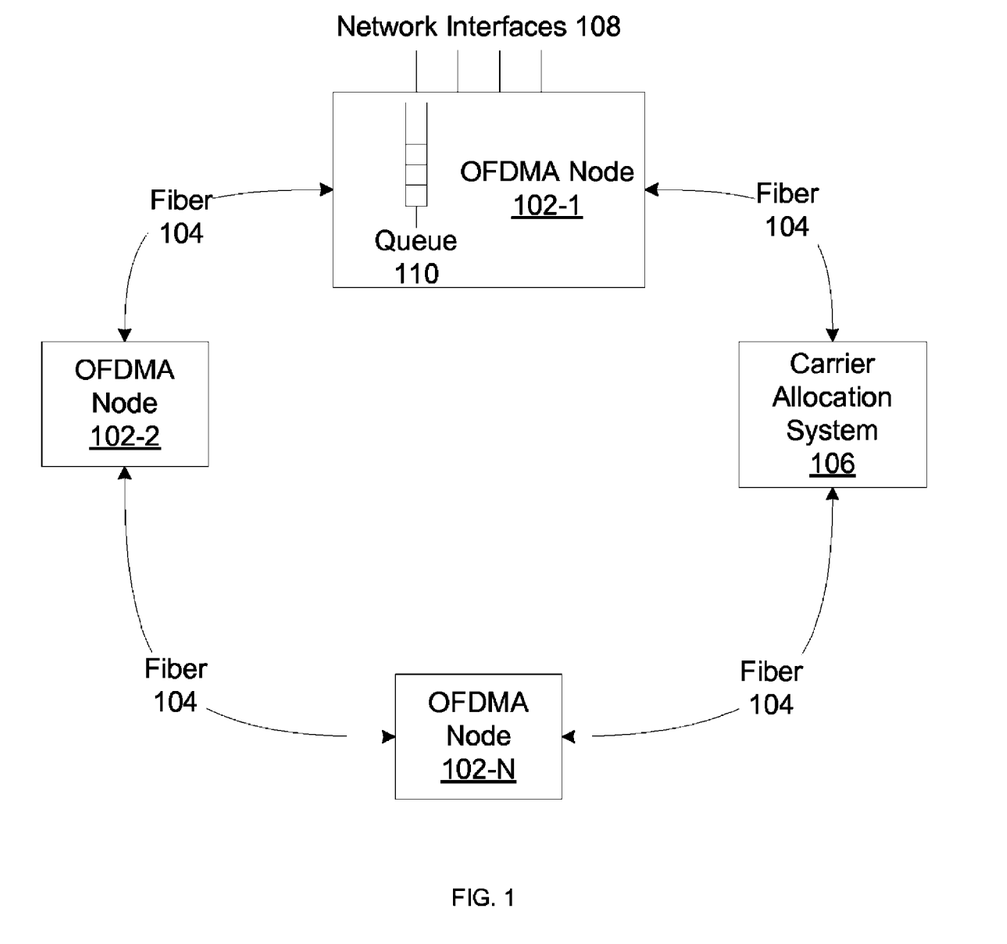
FIG. 1 is a block diagram showing an optical OFDMA ring network with a carrier allocation system.

Referring now in detail to the figures in which like numerals represent the same or similar elements and initially to FIG. 1, an exemplary optical Orthogonal Frequency Division Multiple Access (OFDMA) network in a ring topology according to the present principles is shown. The network comprises a plurality of nodes 102-1 through 102-N, connected by fiber optic links 104. Each node is connected to its respective network(s) through one or more network interfaces 108 and each has at least one queue 110 (shown only for node 102-1 for simplicity) in which the node stores received data until the data can be transmitted along the fiber. The fiber links 104 may comprise one or more separate fibers and are arranged in a ring topology, such that each node 102 receives the transmissions of every node 102 on the ring. In addition to the nodes 102, there is a carrier allocation system 106.

In an optical OFDMA network, each node 102 is assigned a set of carrier frequencies to use for transmission. These frequencies are selected to be orthogonal, such that the transmissions of the nodes 102 do not interfere with each other. The use of multiple carrier frequencies allows for greater flexibility than is possible in time-based allocation schemes. The carrier allocation system 106 assigns sub-carriers to the nodes based on a determination of the most efficient distribution of bandwidth. This determination is made according to a utility function which takes into account queue length, data arrival rate, and Signal to Noise Ratios (SNR) from each of the nodes. The carrier allocation system 106 may operate on a dedicated control carrier and may be a stand-alone device, as shown in FIG. 1, or it may be a component of one or more of the nodes 102. Having a plurality of nodes which comprise a carrier allocation system leads to additional failure resistance at the price of higher node cost.

Figure 2:
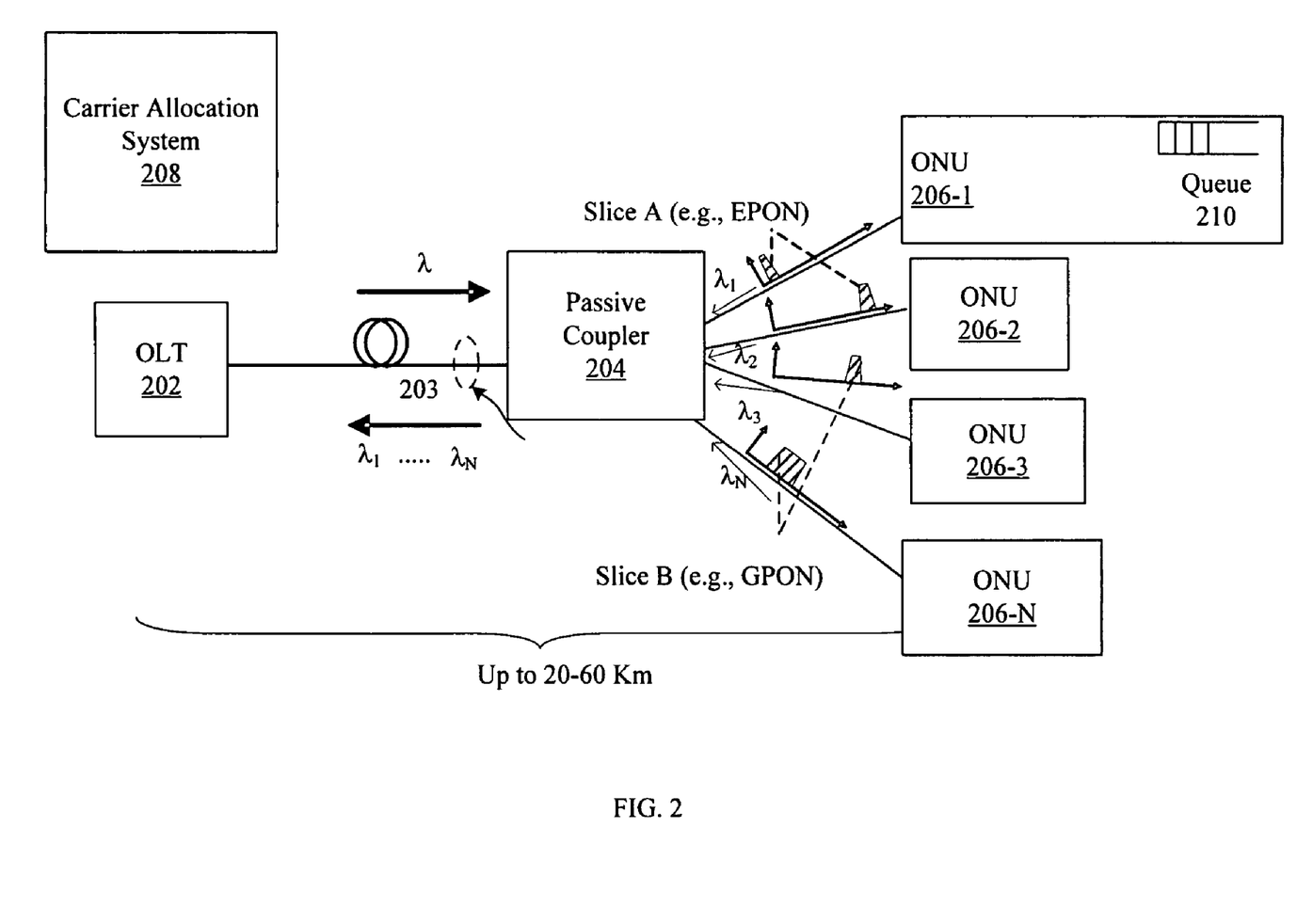
FIG. 2 is a block diagram showing an OFDMA passive optical network with a carrier allocation system.

FIG. 2 depicts an OFDMA Passive Optical Network (PON) according to the present principles. One Optical Line Terminal (OLT) 202 is connected to a larger network through its network interface. It is also connected via a single fiber 203 to a passive coupler 204. The passive coupler 204 splits the signals from the OLT 202, transmitted at a wavelength $\lambda$, and sends them along further fibers to a plurality of Optical Network Units (ONUs) 206-1 through 206-N. The ONUs 206 may be homogeneous and operate according to one PON standard (e.g., Gigabit PON (GPON) or Ethernet PON (EPON)), or they may operate according to different PON standards, with ONUs using the same differing standard comprising different "slices" of the network. Furthermore, the ONUs 206 may be separated from the OLT 202 by many kilometers. Each ONU 206 transmits back along the same fibers 203, through passive coupler 204, to communicate with the OLT 202. The ONUs represent end users, and each ONU has a queue 210 (shown only for ONU 206-1 for simplicity) in which it stores data until it can be transmitted to the OLT.

Conventionally, ONUs used a single frequency and transmitted to the OLT according to a time-based sharing of the fiber. While the OLT's transmissions were sent at a different wavelength from the ONUs', the ONUs all shared a single carrier.

According to the present principles, each of the ONUs 206-1 through 206-N is assigned a set of sub-carriers by the carrier allocation system 208. In the case of FIG. 2, the carrier allocation system 208 is depicted as a stand-alone device which communicates with the OLT 202, but it is also contemplated that the carrier allocation system 208 may be a component of the OLT.

FIG. 2 shows that each ONU 206-1 through 206-N transmits signals in its own respective set of carriers, $\lambda_1$-$\lambda_N$. Along with the data usually sent by the OLT 202 is sent control information comprising carrier assignments. The carrier allocation system 208 periodically revises carrier assignments based on queue length, data arrival rate, and measured SNR. In this way, all of the ONUs 206 may transmit simultaneously, each with a bandwidth appropriate to its Quality of Service (QoS) requirements.

Figure 3:
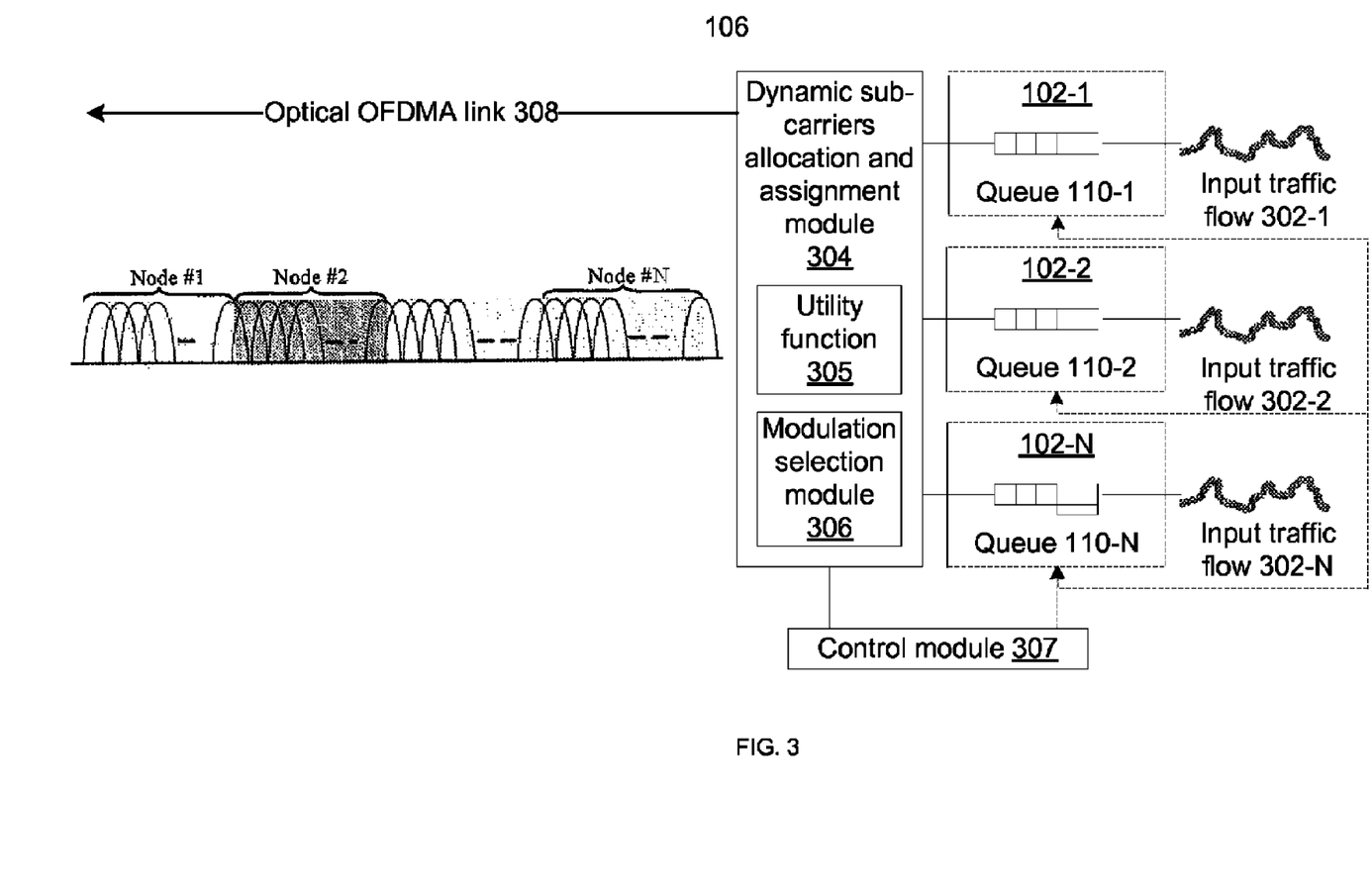
FIG. 3 is a block diagram showing additional detail on the carrier allocation system.

FIG. 3 provides further detail on the Carrier Allocation System 106. Each node 102-1 through 102-N receives an input traffic flow 302-1 through 302-N, which accumulates in each node's queue 110-1 through 110-N, before being transmitted on optical OFDMA link 308. Information on the length of each node's queue is collected by the dynamic sub-carrier allocation and assignment module 304, which uses a utility function 305 to allocate sub-carriers to the nodes, and comprises a modulation selection module 306 to select the modulation scheme (such as, e.g., Quadrature Phase Shift Keying (QPSK) or 16-ary Quadrature Amplitude Modulation (16-QAM)) that is most appropriate for a given node based on a signal to noise threshold table. A control module 307 then communicates with each of the nodes to instruct them as to which sub-carriers and which modulation scheme to use in transmission. Each node then transmits over optical OFDMA link 308 according to its assigned sub-carriers and modulation scheme.

Embodiments described herein may be entirely hardware, entirely software or including both hardware and software elements. In a preferred embodiment, part of the present invention is implemented in software, which includes but is not limited to firmware, resident software, microcode, etc., and controls a network hardware.

Embodiments may include a computer program product accessible from a computer-usable or computer-readable medium providing program code for use by or in connection with a network hardware device. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 4:
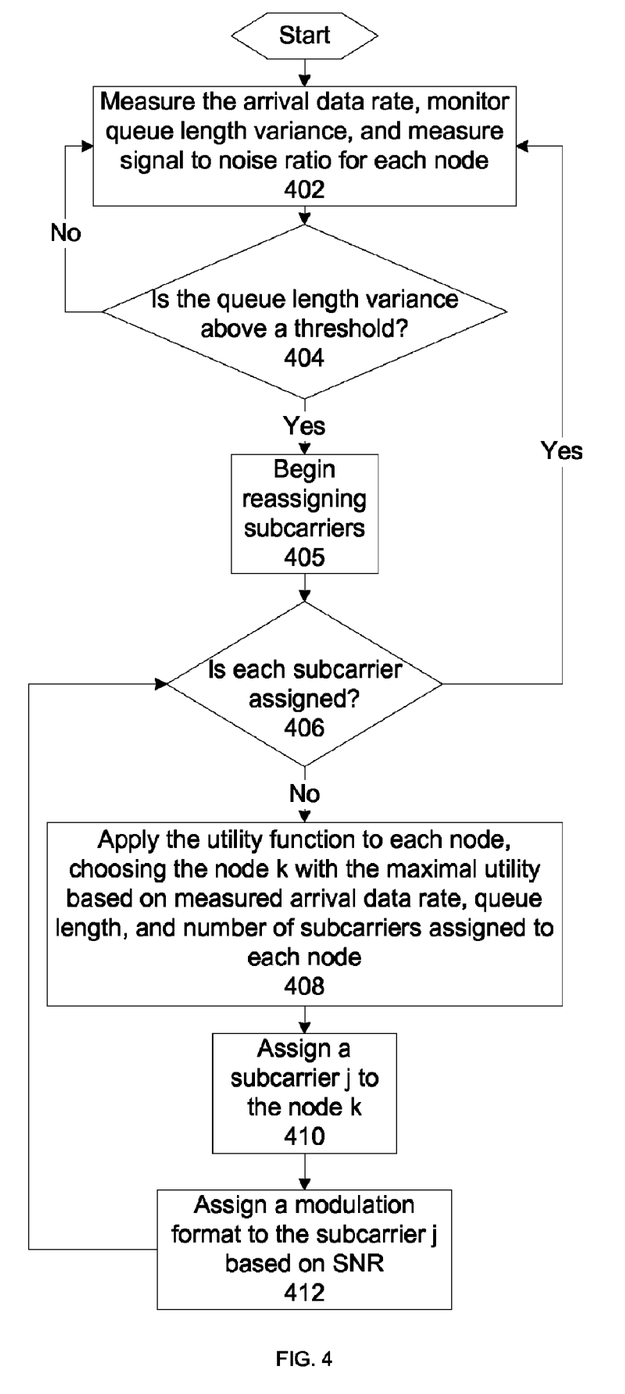
FIG. 4 is a block diagram of a method for dynamically allocating sub-carriers to the nodes of an optical OFDMA network.

Referring now to FIG. 4, a method for dynamically allocating carriers in optical OFDMA networks is shown. Sub-carrier allocation schemes proposed for wireless applications, such as the multi-user diversity method and the cross-layer method, are ill-suited to the optical domain, due to its high complexity, different fading channel, and low bandwidth flows. FIG. 4 depicts a method according to the present principles for allocating carriers. The method is designed for use in an optical OFDMA network.

The method begins with measuring in real time the arrival data rate, the queue length variance, and the SNR for each of the nodes (or ONUs) at block 402. If the queue length variance does not exceed a threshold at block 404, the method goes back to measuring block 402. If the queue length variance does exceed a threshold (i.e., if the queue lengths of the nodes are significantly unbalanced), the method begins to reassign sub-carriers at 405. If there are unassigned sub-carriers (block 406), the method describes using a utility function at block 408. The utility function step chooses a node k which maximizes the utility function based on real-time measurements of queue length, arrival data rate, SNR, and the number of sub-carriers already assigned to each node. At block 410 a sub-carrier j is assigned to the node k, and at block 412 a modulation scheme is assigned to the sub-carrier j. The method then returns to block 406. If there are no unassigned sub-carriers remaining, the method returns to the measuring block 402.

The utility function used in block 408 is a part of this process. The basic idea of dynamic sub-carrier allocation in optical OFDMA systems is to maximize each sub-carrier's utility during each short time period (a scheduling interval, e.g., 100 ms) according to: 1) the measured real data arrival rate in each node; 2) an adaptive modulation scheme sensitive to SNR; and 3) queuing length (delay). The randomly arriving incoming packets in each node are buffered in a FIFO queue. The scheduling interval may be chosen by monitoring the queuing length variance across the nodes. This allows the tracking of rapid rate variance in traffic flows. Generally, the scheduling interval falls in the range of one millisecond to one second, depending on the traffic flow patterns.

Figure 5:
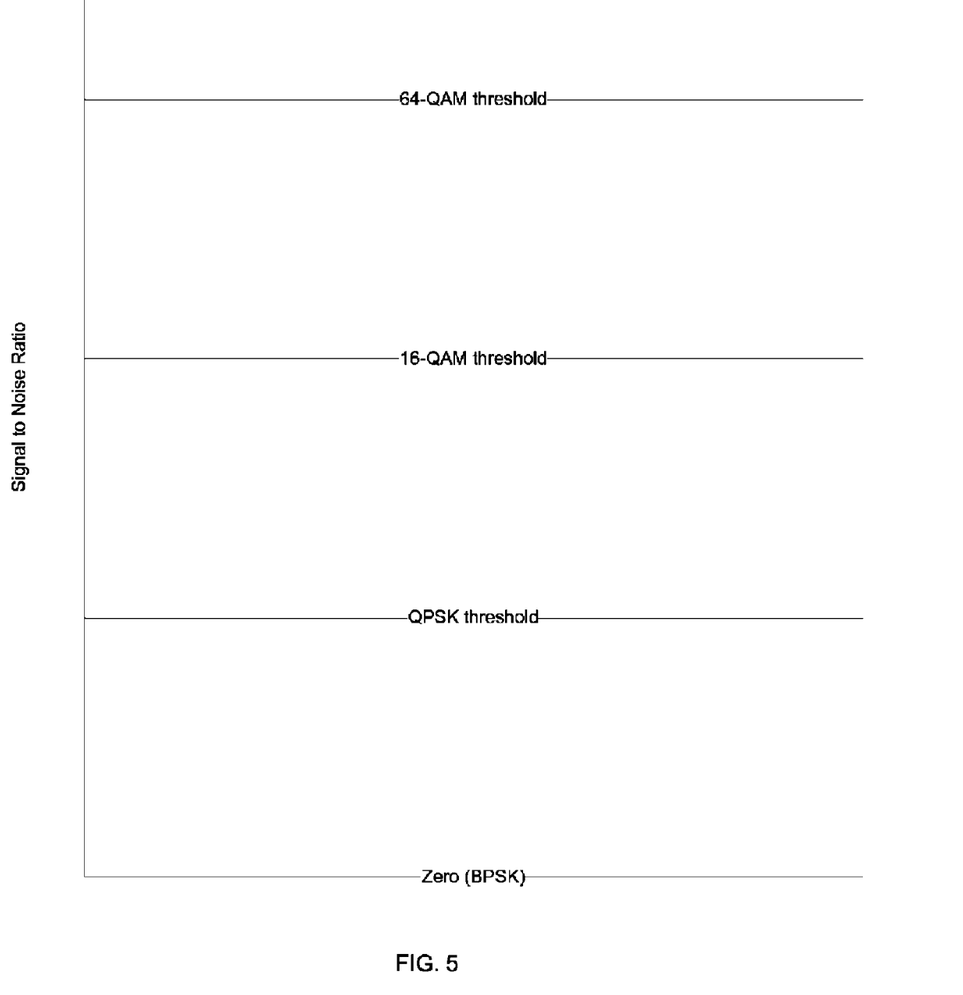
FIG. 5 is a qualitative graph showing how modulation schemes may be chosen based on Signal to Noise Ratio thresholds.

Several parameters are defined as follows: M is number of optical OFDMA nodes; N is total number of sub-carriers in the optical ring; $\lambda_i(\bar{t})$ the measured real arrival data rate for node i during the last scheduling interval $\bar{t}$. The serving rate is defined as $$\mu_i(t) = \sum_j (x_{i,j} \times d_{i,j})$$

where $x_{i,j}=1$ if the sub-carrier j is assigned to node i, otherwise $x_{i,j}=0$; $d_{i,j}$ is the corresponding data rate of each sub-carrier when using an adaptive modulation scheme based on the transmission quality (i.e., SNR). The buffer occupancy of node i is modeled as $e^{\bar{b}_i(\bar{t})/B_i}$, where $\bar{b}_i(\bar{t})$ is the measured average queuing length during the last scheduling interval $\bar{t}$ and $B_i$ is the node i buffer size. Let $\Delta_i(t)$ be the set of carriers assigned to node i in current scheduling cycle t. The utility function 305 can then be implemented as follows:

1. For (j=t; j++; j≦N)// assign each sub-carrier
2. k=argMax($\lambda_i(\bar{t})/\mu_i(t) \times e^{\bar{b}_i(\bar{t})/B_i}$)// choose a node k that make sub-carrier j has maximal utility.
3. $x_{k,j}=1$; $\Delta_k(t) \cup \{j\}$; //; // assign sub-carrier j to node k As noted above, after a sub-carrier has been assigned, an appropriate modulation scheme is chosen. Different modulation schemes have different levels of sensitivity to noise, where higher-bandwidth schemes use higher SNRs. This can be accomplished using a series of thresholds, stored in a table, whereby the highest threshold that the SNR exceeds dictates the modulation scheme to use. FIG. 5 shows a qualitative graph which illustrates this. For very low SNRs, Binary Phase Shift Keying (BPSK) may be used, because it has a high noise tolerance. After a first SNR threshold, the SNR is high enough to allow the use of QPSK. After a second SNR threshold, 16-QAM is permitted. Higher thresholds permit higher-bandwidth modulations.

Having described preferred embodiments of a system and method for dynamically allocating sub-carriers between the nodes of an optical OFDMA network (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for dynamically allocating sub-carriers to optical transmitters in an optical, Orthogonal Frequency Division Multiple Access (OFDMA) network, comprising:
   a dynamic sub-carrier allocation and assignment module configured to dynamically assign sub-carriers to a plurality of optical transmitters according to a utility function, based on measurements of a data arrival rate and a queue length variance for each optical transmitter;
   a control module configured to communicate sub-carrier assignments to the plurality of optical transmitters; and
   a modulation selection module configured to select a modulation scheme for each sub-carrier based on a measured signal to noise ratio for each optical transmitter.

2. The system of claim 1, wherein the modulation selection module comprises a table of signal to noise thresholds.

3. The system of claim 1, wherein the data arrival rate and queue length variance are measured in real-time.

4. The system of claim 1, wherein the utility function is $\lambda_i(\bar{t})/\mu(t) \times e^{\bar{b}_i(\bar{t})/B_i}$, where $\lambda_i(\bar{t})$ is the measured data arrival rate for node i during a scheduling interval $\bar{t}$, $\mu(t)$ is the rate at which data is served by node i at time t, $\bar{b}_i(\bar{t})$ is a measured average queue length for node i during the last scheduling interval $\bar{t}$, and $B_i$ is a buffer size for node i.

5. The system of claim 1, wherein the optical transmitters form nodes in a ring network topology.

6. The system of claim 5, wherein the control module communicates with the nodes via a dedicated, control sub-carrier.

7. The system of claim 5, wherein the dynamic sub-carrier allocation and assignment module and the control module are components in one or more of the nodes.

8. The system of claim 5, wherein the dynamic sub-carrier allocation and assignment module and the control module are components in a stand-alone device.

9. The system of claim 1, wherein the optical transmitters form optical network units in a passive optical network.

10. The system of claim 9, wherein the optical network units all operate homogeneously according to a single passive optical network standard.

11. The system of claim 9, wherein the optical network units operate heterogeneously according to a plurality of passive optical network standards.

12. The system of claim 9, wherein the dynamic sub-carrier allocation and assignment module and the control module are components of an optical line terminal.

13. The system of claim 9, wherein the dynamic sub-carrier allocation and assignment module and the control module are components in a stand-alone device that communicates with an optical line terminal.

14. A method for assigning sub-carriers in an optical, Orthogonal Frequency Division Multiple Access (OFDMA) network having a plurality of sub-carriers and a plurality of nodes, comprising:
   measuring in real-time the data arrival rate and queue length variance for each node;
   assigning sub-carriers to nodes based on a utility function based on the nodes' data arrival rates and queue length variance;
   measuring the signal to noise ratio for each node; and
   selecting a modulation scheme for each sub-carrier after it has been assigned to a node based on the measured signal to noise ratio.

15. The method of claim 14, wherein said assigning step takes place only when the nodes' queue length variance exceeds a threshold.

16. The method of claim 14, wherein the data arrival rates and queue length variance are measured in real time.

17. The method of claim 14, wherein the utility function is $\lambda_i(\bar{t})/\mu(t) \times e^{\bar{b}_i(\bar{t})/B_i}$, where $\lambda_i(\bar{t})$ is the measured data arrival rate for node i during a scheduling interval $\bar{t}$, $\mu(t)$ is the rate at which data is served by node i at time t, $\bar{b}_i(\bar{t})$ is a measured average queue length for node i during the last scheduling interval $\bar{t}$, and $B_i$ is a buffer size for node i.

18. The method of claim 14, wherein the assigning step is conducted periodically.

19. The method of claim 14, wherein said selecting is accomplished by comparing measured signal to noise ratio to signal to noise thresholds.

20. A non-transitory computer readable medium comprising a computer readable program, wherein the computer readable program when executed on a computer causes the computer to execute the steps of claim 14.

* * * * *